LOGARITHMIC FREQUENCY DISCRIMINATOR CIRCUITS

Filed July 26, 1961 6 Sheets-Sheet 1

Frank R. Bravenec
INVENTOR.

BY Browning, Simms, Hyer & Eickenroht
ATTORNEYS

Frank R. Bravenec
INVENTOR.

BY Browning, Simms, Hyer & Eickenroht
ATTORNEYS

Frank R. Bravenec
INVENTOR.
BY Browning, Simms, Hyer & Eickenroht
ATTORNEYS

Frank R. Bravenec
INVENTOR.
BY Browning, Simms, Hyer & Eickenroht
ATTORNEYS

LOGARITHMIC FREQUENCY DISCRIMINATOR CIRCUITS

Filed July 26, 1961 6 Sheets-Sheet 5

Frank R. Bravenec
INVENTOR.
BY Browning, Simms, Hyer & Eickenroht
ATTORNEYS

LOGARITHMIC FREQUENCY DISCRIMINATOR CIRCUITS

Filed July 26, 1961 6 Sheets-Sheet 6

Frank R. Bravenec
INVENTOR.
BY Browning, Simms, Hyer & Eickenroht
ATTORNEYS

3,120,647
LOGARITHMIC FREQUENCY DISCRIMINATOR CIRCUITS

Frank R. Bravenec, Houston, Tex., assignor to Houston Instrument Corporation, Houston, Tex.
Filed July 26, 1961, Ser. No. 126,987
7 Claims. (Cl. 331—16)

This invention relates to logarithmic-to-linear conversion circuits which produce an output signal having a voltage varying linearly with the logarithm of the frequency of an input signal. In another aspect, it relates to an improved oscillator circuit in which a reference voltage and a feedback voltage from a logarithmic-to-linear conversion circuit are used to control the output frequency of an oscillator. In still another aspect, it relates to such an oscillator circuit arranged so that a linear variation of the reference voltage causes the logarithm of the output frequency of the oscillator to vary linearly with the magnitude of the reference voltage.

Logarithmic scales are in widespread use in meters, plotters, recorders and the like because of the well known fact that a logarithmic scale yields equal accuracy in percent of reading over its entire range and because it permits a broad range of magnitudes to be accommodated on a scale of reasonable physical length. Since many of the drive mechanisms for the pens of these recorders or plotters, or for the indicating element of a meter, are linear devices, the signal used to control the positioning of the pens or indicating elements must vary logarithmically with the characteristic of the input signal which is to be recorded in order that the final record or indication will be logarithmic. These principles find particular application in frequency meters or recorders which are to indicate or record a wide range of frequency. In such case, the readout must necessarily be logarithmic in order to have an acceptable degree of accuracy at the ends of the range.

Various devices have been suggested to provide an output signal which varies with the logarithm of an input signal frequency over a limited range of frequency, but accuracy and range limitations have heretofore prevented their commercial use. Moreover, devices of the foregoing type have been relatively complex and, most important, have been relatively inaccurate in that accuracies over a three-decade range of the order of 5 to 7 percent have been considered good.

It is therefore an object of this invention to provide a device which produces an output signal varying linearly with the logarithm of the frequency of an input signal, the device being susceptible of use over a very wide range of frequencies and with a high degree of accuracy.

Another object is to provide such a device which is of relatively simple construction and yet is stable in operation.

Another object is to provide such a device having an output signal which is linear with the logarithm of the frequency of an input signal despite the fact that the input signal may be of complex wave shape or that it may vary widely in amplitude.

In addition to devices of the foregoing type (hereinafter sometimes called "log frequency discriminators"), this invention contemplates providing improved oscillator circuits employing such a discriminator. In the past, variable frequency oscillators have been suggested which provide a D.C. output signal which varies in voltage approximately with the logarithm of the output frequency of the oscillators. However, these oscillators normally provide a range of only one decade. Others which cover a larger range are only approximately logarithmic in terms of the D.C. output signal (provided by a non-linear potentiometer coupled with the dial shaft) and the true frequency.

Thus, available oscillators have not been able to provide output signals whose frequency varies anti-logarithmically with changes in a linear control device for the oscillator with acceptable accuracy over more than one decade of frequency. Moreover, the oscillator circuits per se have had to be carefully designed and constructed to obtain even the accuracies heretofore achieved and this means that these circuits are expensive to build.

It is therefore an object of this invention to provide a variable frequency oscillator circuit which includes a logarithmic frequency discriminator to continuously monitor frequency and arranged so that the logarithm of the frequency of the output signal varies in proportion to a control voltage so that for any given control voltage, the output frequency will accurately correspond thereto despite a non-logarithmic or erratic relationship in the oscillator between its output frequency and its output frequency control means.

Another object is to provide such an oscillator circuit whose output frequency can be closely controlled despite any drifting of the oscillator.

Another object is to provide an oscillator circuit in which a logarithmic frequency discriminator is incorporated in such a manner that the logarithm of the output frequency of the oscillator varies linearly with a control or reference voltage so that by simply causing the reference voltage to sweep in a desired manner over a desired range, the frequency of the oscillator output can be caused to sweep linearly in terms of anti-logarithmic values over a corresponding range.

Another object of the invention is to provide an oscillator circuit in which a linear variation of a reference signal causes a precisely corresponding linear variation of the logarithm of the frequency of the oscillator output signal.

Another object of the invention is to provide a wide range sweep oscillator in combination with an X—Y recorder whereby a manual or motor driven movement of one axis of the recorder causes a sweep in oscillator frequency in an exact linear-logarithmic relationship, thus providing a test signal to be used for simultaneous testing and recording of frequency response of filters, amplifiers and other frequency sensitive devices.

Other objects, advantages and features of the invention will be apparent to one skilled in the art upon consideration of the specification, claims and drawings wherein:

Figure 1:
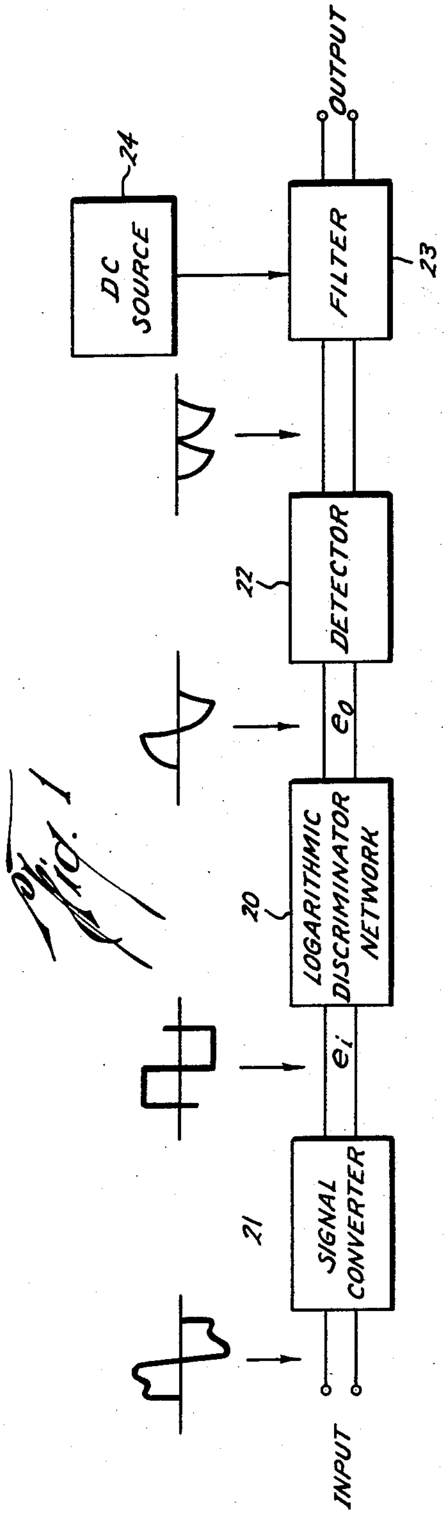
FIG. 1 is a block diagram illustrating a logarithmic frequency discriminator circuit which produces a D.C. output voltage varying linearly with the logarithm of the frequency of an input signal of unknown frequency.
Figure 6:
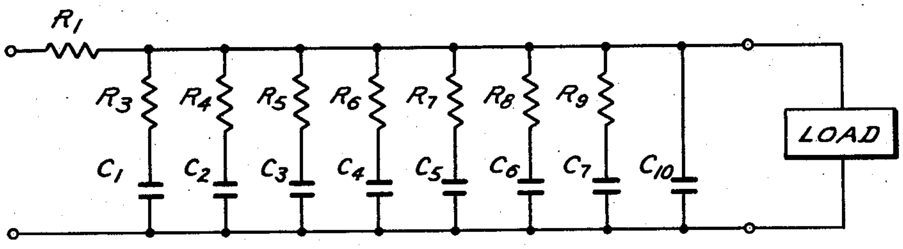
FIG. 6 illustrates a discriminator network comprising a much larger number of the resistance-capacitance units than are shown in FIGS. 2 and 4 so as to extend the response of the network to be over a broad frequency range.
Figure 8:
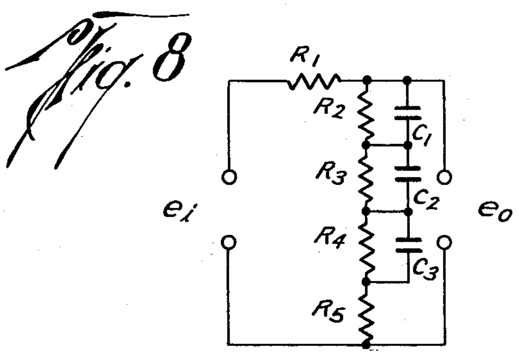
FIG. 8 illustrates another form of the discriminator network having the same type of response as the one shown in FIG. 6.
Figures 9, 10, 11:
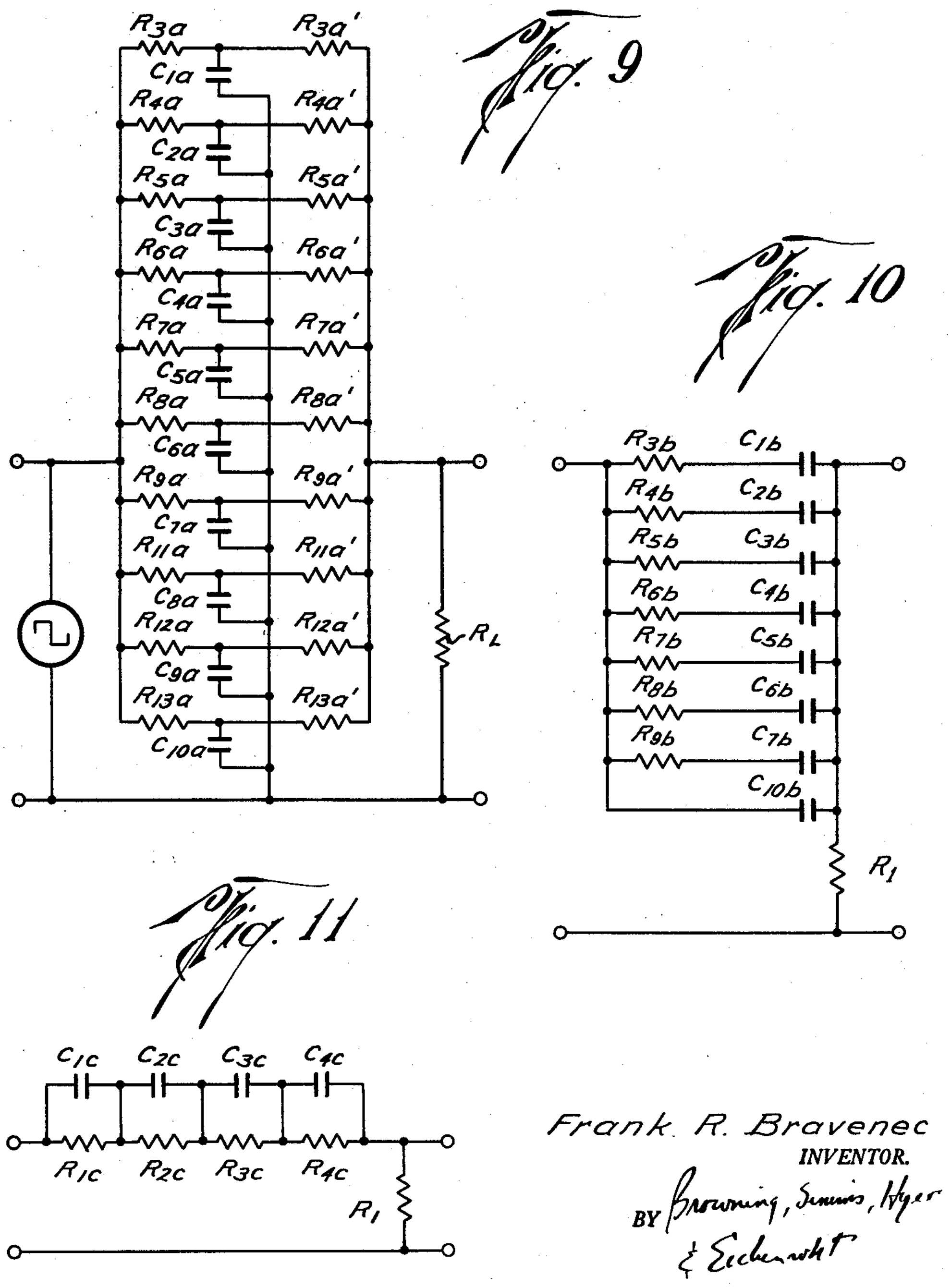
FIG. 9 shows still another form of the discriminator network which is the same as that shown in FIG. 6 except that it also includes a resistance readout circuit.
Figure 12:
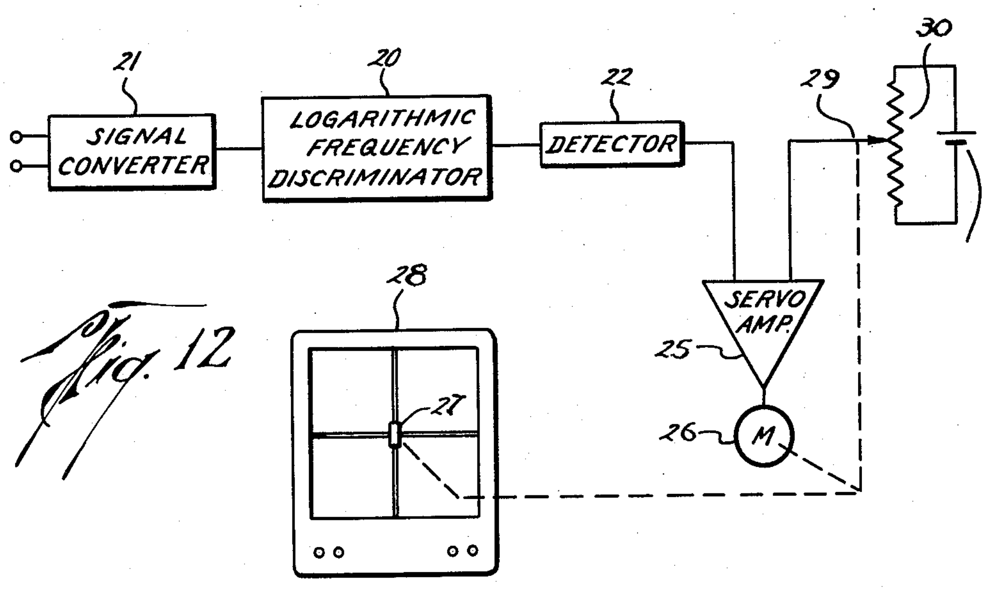
Figure 13:
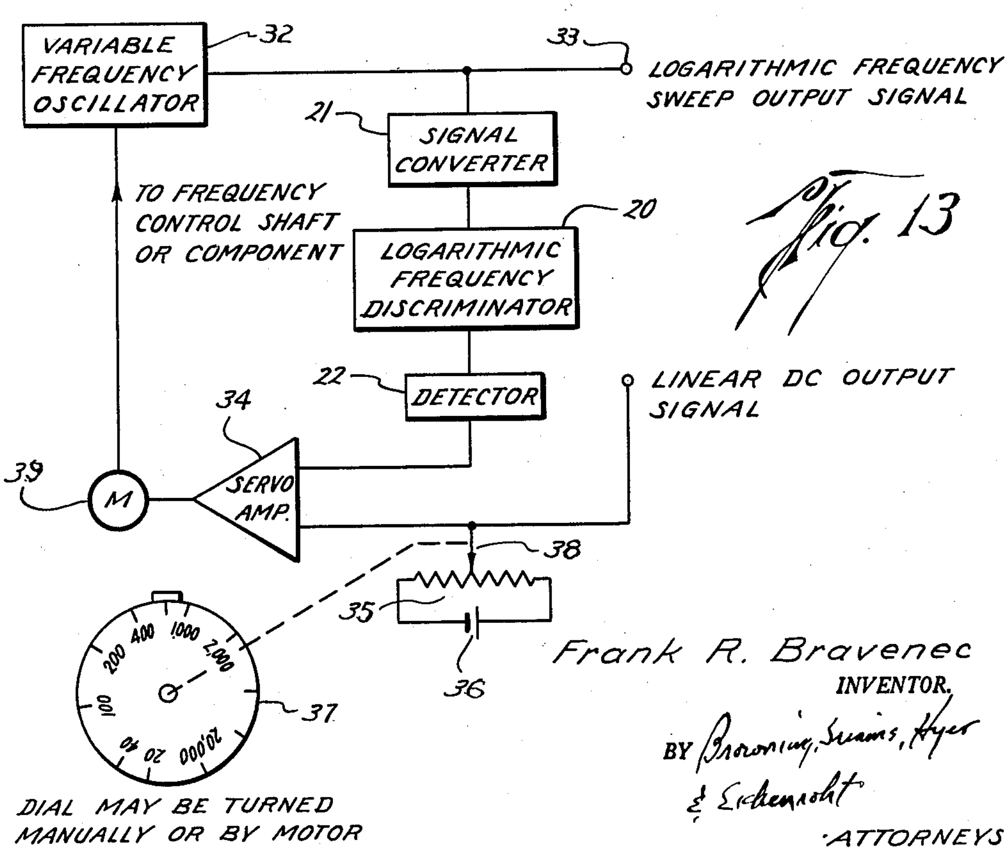
Figure 14:
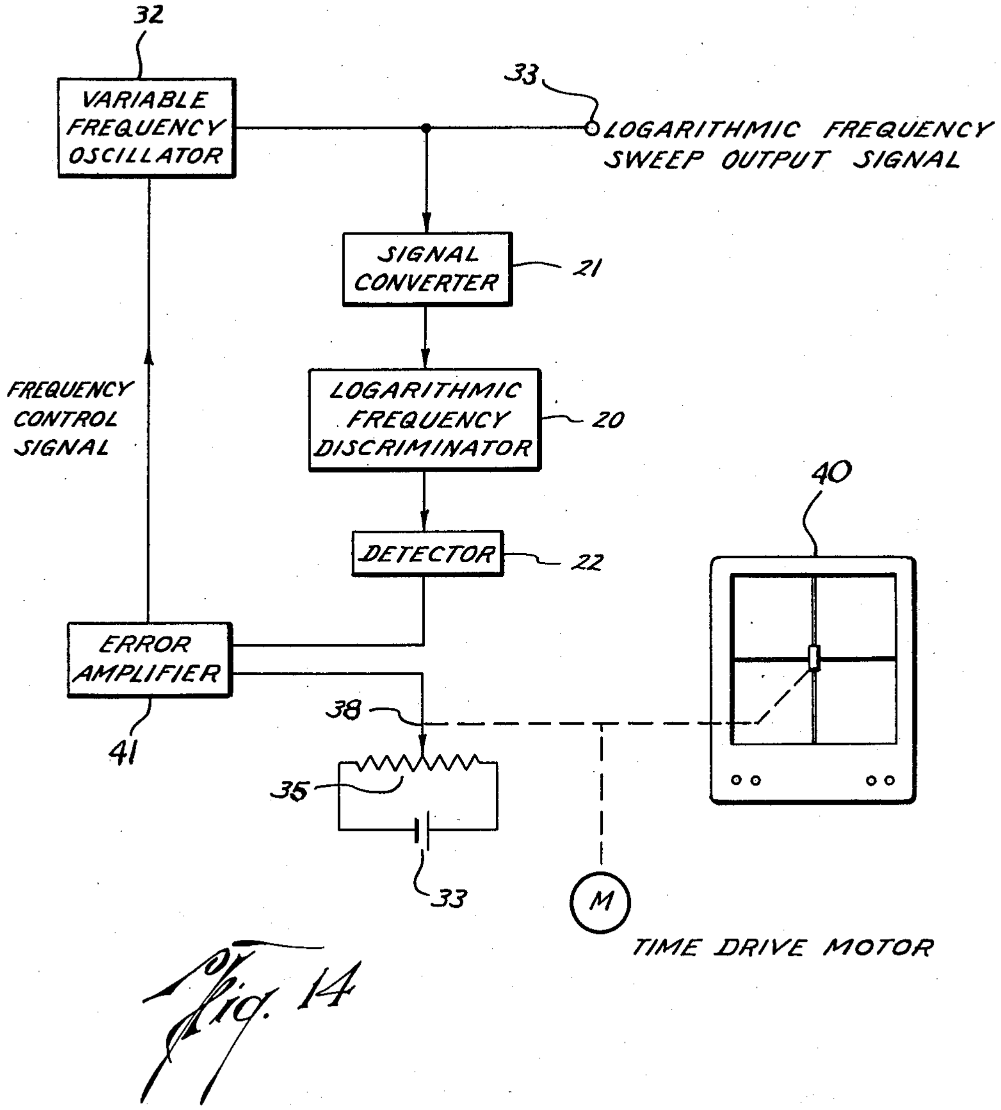

FIGS. 10 and 11 show other discriminator networks similar to those of FIGS. 6 and 8 except that their response curve is positive sloping instead of negative sloping as in the cases of FIGS. 6 and 8;

FIG. 12 illustrates the manner in which apparatus of the type shown in FIG. 1 can be used to control the log frequency axis of an X—Y recorder;

FIG. 13 illustrates an oscillator circuit including a log frequency discriminator arranged so that the logarithm of the oscillator output frequency is a linear function of a reference voltage and dial position; and FIG. 14 shows a combined oscillator and recorder to be used for simultaneous testing and recording of frequency response of filters, amplifiers and other frequency sensitive devices.

Like characters of reference will be used throughout the several views to designate like parts.

Referring now to FIG. 1, the logarithm discriminator network 20 (to be described in greater detail below) has a transfer function such that the ratio of the output to the input voltage ($e_o/e_i$) varies linearly with the logarithm of the frequency of the input signal to the network. Then by causing the input signal to the discriminator network 20 to be of constant voltage amplitude and of a uniform wave shape, only variations in its frequency will affect the output voltage signal $e_o$ and therefore, the latter varies linearly with the logarithm of the frequency of the input signal.

The constant amplitude, uniform wave shape input signal is generated by a signal converter 21. In effect, the latter receives a signal of unknown frequency and amplitude at its input terminals and converts this into the constant voltage amplitude, uniform wave shape signal which is fed to the discriminator network. The signal converter can take a number of forms as long as its output is of constant amplitude and uniform wave shape despite variations in amplitude and wave shape of the unknown signal and as long as its frequency is equal to, or is a multiple or sub-multiple of, the unknown frequency, i.e., bears a fixed constant relationship thereto. In one form, the signal converter can be an amplifier of one or more stages with suitable clipping, such as by Zener diodes, between stages so that the output is a square wave of constant voltage amplitude and having a relatively short rise time.

Alternatively, the converter could be a Schmidt trigger or a flip-flop multivibrator circuit constructed so as to be triggered to produce a constant voltage amplitude square wave output of a frequency equal to that of the input signal. Further, the signal converter can include a frequency divider circuit so that its output frequency is a sub-multiple of the input frequency. This division of input frequency may be of some advantage in those cases where a given range of input frequencies are to be fed into the converter and yet a discriminator network of a different frequency range is used. In this manner, a log frequency network of any given range can accommodate a different range of input frequencies.

The output signal from the discriminator network is such, as indicated, that its characteristics of voltage amplitude and wave shape (i.e., the area within each half cycle of the voltage wave form) vary linearly with the logarithm of the input frequency to the network. Stated in another way, the output signal has a D.C. voltage equivalent which varies linearly with the log of the input frequency. Then by passing the output signal to a suitable detector, and preferably also a filter, it can be converted into such a D.C. output. Thus, as shown in FIG. 1, the output signal from the network passes to a detector 22 which can preferably be an average value detector and can be either a full or a half wave type. The output of this detector is smoothed in a filter 23 to provide an output across the terminals 24 varying as aforesaid. The detector can also be of the peak or of the R.M.S. types.

In some specific constructions of the detector, the response is such that the detector output voltage is negative in character whereas a positive voltage output may be desired. One way of providing this positive voltage output is shown in FIG. 1 wherein a positive D.C. source 24 is applied as a bias to filter 23. This will result in shifting the reference level of the detector output voltage so that the final output voltage of the filter is positive. Another manner of providing positive output voltage would be to cause the detector to detect the positive half waves.

From the foregoing, it will be seen that by converting a signal of unknown frequency and wave shape into one of constant amplitude and uniform wave shape, but having a frequency with a fixed relationship with the unknown frequency, the logarithmic discriminator network can function to convert this signal into one having a D.C. equivalent which varies as the logarithm of the unknown input frequency.

Figure 3:
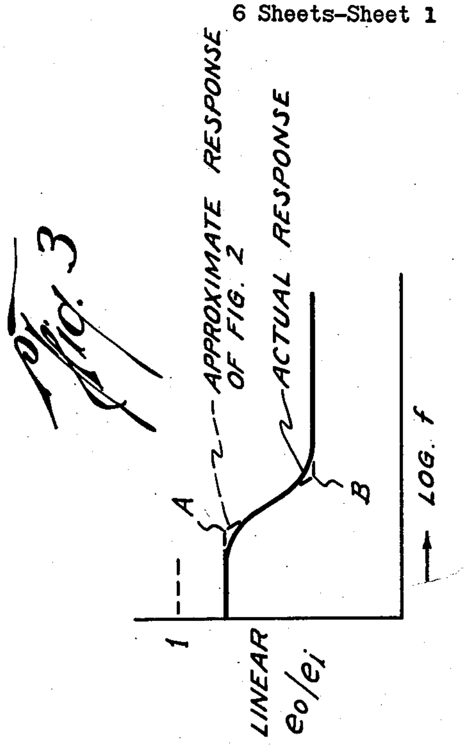
FIG. 3 is a plot of the response curve of the network of FIG. 2.
Figure 2:
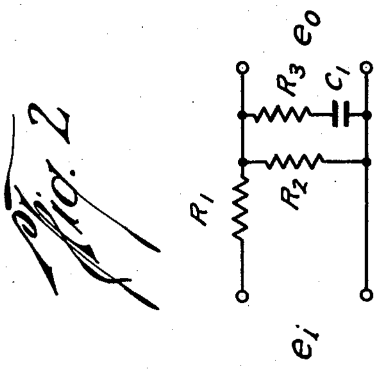
FIG. 2 is a schematic illustration of a circuit including one of the resistance-capacitance units employed in the logarithmic discriminator network of FIG. 1 and which will be used to explain the principle of such network.

Turning now to the details of the logarithmic discriminator network, reference is first made to FIGS. 2 and 3 to explain the principle thereof. In FIG. 2, there is shown a four-terminal network including resistances $R_1$ and $R_2$ which act as a voltage divider for the input signal and the series resistance-capacitance unit $R_3$—$C_1$ in parallel with $R_2$. When an input signal of increasing frequency is fed into this unit, the response of the unit in terms of the ratio of the output voltage $e_o$ to the input voltage $e_i$ (this ratio sometimes herein being called the transfer function of the four-terminal network) versus log of the input frequency is shown in FIG. 3.

The transfer function ($e_o/e_i$) can be written in terms of the various impedances in the network. Thus, assume that $Z_1$ is the equivalent impedance of $R_3$ and $C_1$ in series and that $Z_2$ is the equivalent impedance of $R_2$ and $Z_1$ in parallel. The transfer function can then be written:

$$\frac{e_o}{e_i}=\frac{Z_2}{Z_2+R_1}$$

Now referring to the approximate (theoretical) response shown in FIG. 3, it can be seen that at frequencies of low value, the impedance of $C_1$ is relatively high so that with $e_i$ of constant voltage amplitude, $e_o$ is constant and is determined primarily by the voltage divider effect of $R_1$ and $R_2$. Thus, the transfer function remains relatively constant until point A is reached in FIG. 3. At this point, the frequency has increased until the impedance of $C_1$ decreases to values which become significant in the circuit so that the transfer function decreases with increasing log frequency. In the region of point B, the frequencies reach a value such that the impedance of $C_1$ becomes low enough to be insignificant in the circuit and at frequencies above this region, the network is substantially only resistive and hence, the voltage ratio does not change substantially for frequencies above point B.

As indicated above, the input voltage can be considered of constant amplitude insofar as this circuit is concerned and therefore, it will be seen that for the approximate response, the magnitude of the output voltage varies linearly with log frequency over the frequency range between points A and B.

Figure 4:
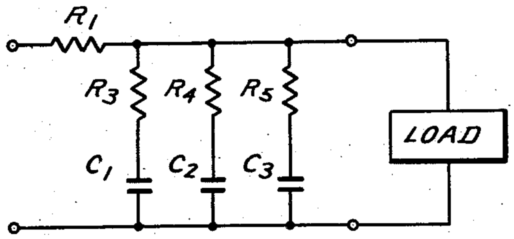
FIG. 4 shows the circuit of FIG. 2 with two additional resistance-capacitance units to demonstrate how the frequency range of the FIG. 2 circuit can be extended.

The theoretical and actual response, or transfer function, of the simplified network of FIG. 2 is not linear with log frequency, although as will be seen from FIG. 3, the actual response can be considered a close approximation to linear over a small portion thereof between the points A and B. The object is then to cause the actual response to be linear over a broader range of frequencies. One way of doing this is to provide a plurality of the R-C units connected in parallel with each other as indicated in FIG. 4.

Figure 5:
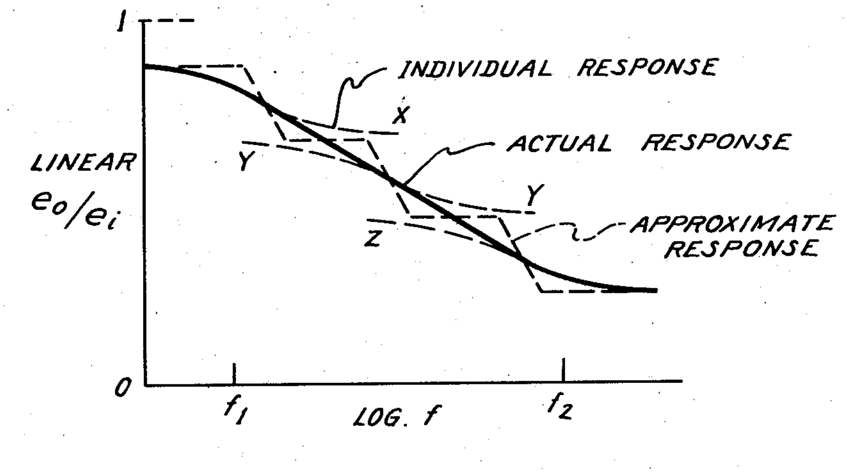
FIG. 5 is a plot similar to FIG. 3 except that it shows the effect of adding the additional resistance-capacitance units as in FIG. 4.

The individual resistances and capacitances of each R-C unit are sized so that each unit's response is over a band of log frequencies different from that of the other units. The units are also sized relative to each other so that the frequency bands to which the units are responsive overlap sufficiently so that, when the rate of change of the voltage ratio (or output voltage) of one R-C unit begins to decrease with increasing log frequency, the rate of change of the voltage ratio of the next R-C unit begins to increase with increasing log frequency at a rate substantially equal to the rate of decrease of the first unit. This is illustrated by the individual actual response curves X, Y, and Z in FIG. 5. As a result, the composite circuit has an actual response curve, as shown in FIG. 5, which is approximately linear over a substantial portion of the three R-C units range. Simple by adding additional R-C units, as shown in FIG. 6, the frequency range of the network can be extended with the succeeding additional units bearing the same relationship to each other as the units described in FIG. 5. It will be appreciated that, for any selected frequency range of the network, increasing the number of R-C units increases the exactitude with which the network response approaches theoretical linearity. However, cost, simplicity and other practical factors, including allowable error, will dictate the number to be used.

Bearing in mind the descriptions of the theory described above with reference to FIG. 5, the network of FIG. 6 will be described in detail. As will be noted from the table below, the values of resistances $R_3$ to $R_9$ in FIG. 6 are of decreasing value in that order and the capacitances of capacitances $C_1$ through $C_7$ likewise decrease in that order. As indicated above, the R-C units are sized relative to each other so as to be responsive to successive bands of log frequencies with the rate of change of the voltage ratio caused by one R-C unit near its useful upper frequency limit being balanced by the rate of change of voltage ratio caused by the next succeeding R-C unit so that the composite response is approximately linear across a substantial portion of the successive log frequency bands of the two units. Thus, in general, as the input frequency increases from a lower value, the impedance of $C_1$ decreases with increasing frequency until its impedance becomes relatively insignificant. As this happens, the resistance of $R_3$ becomes relatively more and more significant. As the impedance effect of $C_1$ begins to fade out with increasing frequency, the impedance effect of $C_2$ begins to decrease to balance out the decreasing effect of $C_1$ and therby afford an approximately linear composite curve. Again, as $C_2$ decreases in impedance with increasing frequency, $R_4$ becomes relatively more significant. Since $R_3$ and $R_4$ are in parallel, the resultant resistance of the first two R-C units decreases as $R_4$ becomes relatively more significant. This, together with the change in impedance of $C_1$ and $C_2$ determines the slope of the response curve. The same impedance phenomena occurs throughout the succeeding legs of the R-C network and thus, the composite response of the entire network decreases approximately linearly with the increase of the log frequency over a fairly wide range.

While it is possible to calculate the individual values of the R-C components of the network, it will usually be found easier to calculate only the values of the resistances and then to breadboard the circuit and establish the values of the capacitances by trial and error. Thus, one procedure is to chose a desired load impedance $R_L$ for the network such as a 100,000 ohm resistance. Then a reasonable value is chosen for $R_1$. This resistance must be large enough to not require an extremely low source impedance to develop the desired input voltage and it must be small enough to permit use of practical values of capacitances in the network. The choice of $R_1$ and $R_L$ determines the maximum value of $e_o/e_i$. Thus if $R_1=25K$ and $R_L=100\ K$, $e_o/e_i$ (maximum)$=0.8$. Then a choice is made of the number of R-C units to be used based on desired accuracy, range and simplicity. By considering the capacitances as switches which successively close at different log frequencies, the resistance values of the R-C units can be calculated so that the voltage ratio decreases in uniform steps. For example, with all "switches" open, $e_o/e_i=0.8$; with "switch" $C_1$ closed, $e_o/e_i=0.7$; with "switch" $C_2$ closed, $e_o/e_i=0.6$; etc. Then if:

$P_3$=parallel equivalent of $R_3$ and $R_L$;
$P_4$=parallel equivalent of $R_3$, $R_4$ and $R_L$;
$P_5$=parallel equivalent of $R_3$, $R_4$, $R_5$ and $R_L$; etc.

Then:

$$\frac{P_3}{R_1+P_3}=0.7$$

$$\frac{P_4}{R_1+P_4}=0.6$$

$$\frac{P_5}{R_1+P_5}=0.5$$

For $R_1=25K$ and $R_L=100K$, from above,
$R_3=140K$; $R_4=105K$; $R_5=75K$; etc.

Resistances of these approximate sizes can then be combined in a circuit with capacitance substitution boxes and the value of each capacitance determined by substituting capacitances until each R-C unit has approximately the desired frequency response characteristics, after which the capacitances can be trimmed to give the desired overall response.

Figure 7:
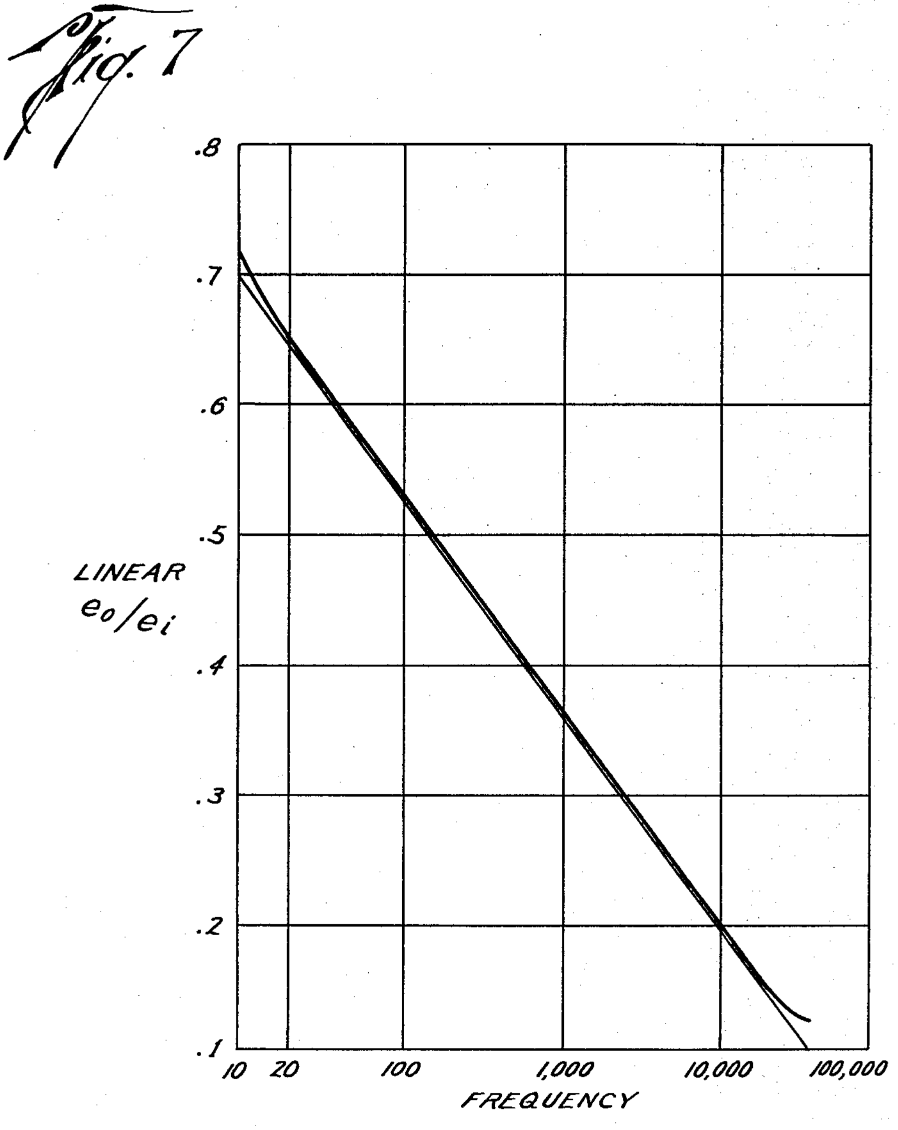
FIG. 7 is a plot of the actual response of the network in FIG. 6 when constructed with components having values disclosed below.

As an example, the network of FIG. 6 can have the following values to yield the actual response curve of FIG. 7:

| Element | Value | Element | Value |
|---|---|---|---|
| $R_3$ | 140K | $C_1$ | .1 microfarad. |
| $R_4$ | 105K | $C_2$ | .05 microfarad. |
| $R_5$ | 75K | $C_3$ | .01 microfarad. |
| $R_6$ | 50K | $C_4$ | .0045 microfarad. |
| $R_7$ | 30K | $C_5$ | .0015 microfarad. |
| $R_8$ | 15K | $C_6$ | 650 micromicrofarads. |
| $R_9$ | 5K | $C_7$ | 500 micromicrofarads. |
| $R_1$ | 25K | $C_{10}$ | 150 micromicrofarads. |

From the foregoing, it will be seen that the resistance and capacitance of each unit are chosen so that in combination with the source impedance and the effective impedances of the other units, the transfer function of the network will vary linearly with the logarithm of the frequency of the input signal to the network.

The R-C network can be of other circuit configurations to produce similar responses. For example, in FIG. 8, the resistances and capacitances of each R-C unit are connected in parallel with each other and the units are connected in series across the signal converter. In this particular arrangement, as the frequency increases, the individual capacitances tend to short out or shunt their companion resistances. For example, as the frequency increases, the impedance of $C_1$ becomes less and less and therefore, the effect of $R_2$ on the circuit also becomes less and less. As the frequency still further increases, $C_2$ begins to shunt $R_3$ and then finally $C_3$ begins to shunt $R_4$ until finally $R_5$ becomes the only significant resistance in the series circuit. Therefore, at the upper end of the frequency range, the voltage ratio of $e_o/e_i$ tends to be determined by the voltage divider effect of $R_1$ and $R_5$. Here again, the values of the resistances and capacitances are determined by the same principles as described above.

In FIG. 9 there is shown a circuit which is essentially the same as that of FIG. 6 except that three additional R-C units have been added to the network and a resistance network readout $R_{3a}'$-$R_{13a}'$ has been added. The values of the individual resistances and capacitances can be as follows to yield a response curve similar to that of FIG. 7:

| Element | Value | Element | Value |
|---|---|---|---|
| $R_{3a}$, $R_{3a}'$ | 215K | $C_{1a}$ | .208 microfarad. |
| $R_{4a}$, $R_{4a}'$ | 196K | $C_{2a}$ | .085 microfarad. |
| $R_{5a}$, $R_{5a}'$ | 178K | $C_{3a}$ | .035 microfarad. |
| $R_{6a}$, $R_{6a}'$ | 160K | $C_{4a}$ | .012 microfarad. |
| $R_{7a}$, $R_{7a}'$ | 140K | $C_{5a}$ | .0038 microfarad. |
| $R_{8a}$, $R_{8a}'$ | 113K | $C_{6a}$ | .00155 microfarad. |
| $R_{9a}$, $R_{9a}'$ | 107K | $C_{7a}$ | .000585 microfarad. |
| $R_{10}$, $R_{10a}'$ | 88K | $C_{8a}$ | 220 micromicrofarads. |
| $R_{11a}$, $R_{11a}'$ | 78K | $C_{9a}$ | 142 micromicrofarads. |
| $R_{12a}$, $R_{12a}'$ | 68K | $C_{10a}$ | 65 micromicrofarads. |

The R-C networks thus far described in detail, as shown in FIGS. 4 through 9, have a response such that the voltage ratio $e_0/e_1$ of the network decreases essentially linearly with increase of log frequency; i.e., the response is a negatively sloping straight line. As explained with reference to FIG. 1, this response can be converted into a positively sloping line by a suitable choice of a detector. FIGS. 10 and 11 show R-C networks having responses such that the voltage ratio increases with increasing log frequency; i.e., the response is a positively sloping line. Thus, the resistance and capacitance of each unit in FIG. 10 are connected in series with each other and the units are connected in parallel with each other. The entire discriminator network is connected so that it acts as a voltage divider with $R_1$. Then, at low frequencies, when the impedance of all the capacitances is high, the voltage drop across the R-C network will be large so that the voltage across the output terminals is low. With increasing frequency, $C_{1b}$ decreases in impedance, thereby causing the voltage drop across the output terminals to increase up to a value determined by the values of $R_1$ and $R_{3b}$. With further increase in frequency, the other capacitances successively decrease in impedance so as to produce an output voltage which increases linearly with increasing log frequency. The values of the R-C units of FIG. 10 can be as follows to yield a linear output:

| Element | Value | Element | Value |
|---|---|---|---|
| $R_{3b}$ | 100K | $C_{1b}$ | .15 microfarad. |
| $R_{4b}$ | 140K | $C_{2b}$ | .05 microfarad. |
| $R_{5b}$ | 105K | $C_{3b}$ | .01 microfarad. |
| $R_{6b}$ | 75K | $C_{4b}$ | .005 microfarad. |
| $R_{7b}$ | 50K | $C_{5b}$ | .0015 microfarad. |
| $R_{8b}$ | 30K | $C_{6b}$ | .001 microfarad. |
| $R_{9b}$ | 15K | $C_{7b}$ | .00022 microfarad. |
| $R_1$ | 25K | $C_{10b}$ | .00072 microfarad. |

The types of networks of FIGS. 10 and 11 are generally not as desirable as that of FIG. 6 with a square wave input due to the larger amounts of high harmonics in the output signal, thus imposing more rigid requirements on the detector at the high frequencies.

The log frequency discriminator of this invention has many applications. For example, in FIG. 12 it is shown in combination with an X—Y recorder, the arrangement being such that the pen of the recorder is positioned in accordance with the log frequency of an input signal to provide a log frequency axis on the record. Here, the output from the detector 22 is fed to a servoamplifier 25 which in turn controls a servomotor 26. The servomotor is connected to move the pen 27 of the X—Y recorder 28 and at the same time, to position a wiper 29 on the linear potentiometer 30 connected across a source of D.C. voltage 31. Thus, as the input frequency changes, the resulting voltage signal from detector 22 will change with the log of such frequency, resulting in an error signal being developed and the servoamplifier causing motor 26 to turn. As a result, wiper 29 will be repositioned to bring the system back into balance. In so doing, pen 27 is moved to reflect the changes in log frequency of the input signal.

It is also contemplated that the system of FIG. 12 can be used to drive the pointer of a wide range frequency meter simply by connecting the motor to the pointer to move the same.

Referring now to FIG. 13, there is shown a circuit which illustrates another aspect of this invention. This circuit (which may be termed a log frequency sweep oscillator circuit) involves the use of a frequency discriminator as a control for a variable frequency oscillator to accurately control the output frequency of the latter. As will be made more evident below, this circuit permits a linearly varying function to coact with the frequency discriminator so as to control the variable frequency oscillator so that its output frequency varies anti-logarithmically with the magnitude of the control voltage. In other words, a closed loop servo system causes the logarithm of the oscillator output frequency to vary linearly with movement of a linear control. Also, the circuit permits almost any kind of variable frequency oscillator to be employed regardless of its response characteristics in terms of frequency versus shaft position and the only requirement for the oscillator is that it be able to oscillate at a substantially constant amplitude throughout the desired frequency range.

Referring now more particularly to FIG. 13, the variable frequency oscillator 32 is illustrated as being of the type whose frequency is changed by rotation of a shaft. The output of the oscillator appears at terminal 33 and this output signal is also applied through the log frequency discriminator comprising the signal converter 21, the logarithmic discriminator network 20 and the detector 22. The output of the detector, which as will be recalled is a voltage varying linearly with the logarithm of the frequency of the oscillator output, is applied to a servoamplifier 34. A control voltage, which may vary linearly, is likewise applied to the servoamplifier so that the latter can sense an error voltage between the control voltage and the output from the log frequency discriminator. The control voltage can be supplied by connecting a potentiometer 35 to a standard voltage source 36 so that upon movement of the calibrated dial 37 connected to wiper 38, the control voltage applied to the servoamplifier will vary linearly. The servoamplifier detects any error voltage between the control and feedback voltages and positions motor 39 in response thereto, thereby maintaining the frequency of the variable frequency oscillator in agreement with the log frequency calibrated dial.

It will thus be seen that, should the oscillator drift in frequency, the resulting drift causes the log frequency discriminator to change its output voltage which in turn causes the servoamplifier to cause motor 39 to turn in such direction as to bring the variable frequency oscillator back to the set frequency. Moreover, if the control voltage is changed as by moving dial 37, the resulting error voltage causes the servomechanism to change the frequency of the oscillator and since the control voltage is being compared to the feedback voltage which is linear with the logarithm of the output frequency, any linear change in the control voltage will result in an anti-logarithmic change of the output frequency. Accordingly, by moving dial 37 at a linear rate either manually or by a motor drive, the output frequency of the oscillator can be made to sweep logarithmically.

Referring now to FIG. 14, this log frequency sweep oscillator may be combined with an X—Y recorder. Wiper 38 can be mechanically connected so as to be moved linearly by the drive mechanism of the X—Y recorder 40, thus providing, simultaneously, a log frequency test signal output from terminal 33 and automatic plotting of log frequency on one axis of the recorder.

From the foregoing, it will be appreciated that, in order to provide an accurate control of the frequency of the output of the circuits of FIGS. 13 and 14, the only elements which need to have a corresponding accuracy are the log frequency discriminator and the potentiometer. Since each of these can readily be designed to have an accuracy of substantially less than one percent, the output frequency can likewise be controlled to be less than one percent. This is true even though oscillator 29 may be non-linear and have erratic response characteristics in terms of output frequency relative to shaft position because even though the oscillator response may be erratic, this will simply result in the servomechanism tuning it to the frequency dictated by the amplitude of the control voltage applied to the servomechanism.

While the foregoing description, with reference to FIGS. 12 and 13, has referred to servomechanisms and particularly to servoamplifiers and servomotors, it will be appreciated that other devices can be used. Thus, the servomechanisms essentially compare a control and a feedback voltage and based upon this comparison, adjust the oscillator. Other circuits or devices which can make this comparison and adjustment can be used such as an error amplifier 41 as indicated in FIG. 14 which produces a signal used to control the oscillator. This control for the frequency adjustment of the oscillator is thus accomplished electronically rather than by using a motor and shaft as in FIG. 13.

It will also be appreciated that, while the log frequency discriminator of FIGS. 13 and 14 is described as a part of the overall oscillator circuit, it is quite separate from the oscillator per se; and thus, in effect, it is a feedback loop aiding in the control of the device or circuit which in turn controls the variable frequency oscillator.

It is important to note that the log discriminator network is designed to operate with an input signal of defined wave form of closely controlled characteristics. It is used to measure frequency, not to determine frequency. Its phase characteristic and input impedance characteristic are unimportant and need not be computed or measured when a network is being designed for a given range of operation.

It should also be noted that the amplitude and wave shape of the output of the signal converter can vary in a predetermined manner with frequency (but not with any other characteristic) since the network elements can be selected or the detector designed, or both, so that the change in amplitude or wave shape of the output of the converter will be compensated in the network or detector, or both, to still yield a D.C. signal varying linearly with log frequency.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been desrcibed, what is claimed is:

1. A logarithmic frequency oscillator circuit comprising a variable frequency oscillator, means for converting the output signal from the oscillator into an intermediate signal of predetermined voltage amplitude and wave shape and of a frequency of fixed relationship to the frequency of said output signal, means for converting said intermediate signal into a first voltage varying linearly in magnitude with the logarithm of the frequency of the intermediate signal including a four-terminal network made up of a plurality of resistance and capacitance elements selected to cause the transfer function of the network to vary linearly with the logarithm of the intermediate frequency, a source of reference voltage, and means comparing the first and reference voltages and controlling the frequency of the variable frequency oscillator responsive to changes in the difference between the first voltage and reference voltage so that the oscillator frequency is maintained in a predetermined relationship to the reference voltage.

2. The oscillator of claim 1 wherein the reference voltage source includes a linear potentiometer for varying the reference voltage whereby a linear change in reference voltage results in an anti-logarithmic change in the output frequency of the oscillator.

3. A logarithmic sweep frequency oscillator circuit having an output frequency which varies anti-logarithmically with a linearly varying reference voltage comprising a variable frequency oscillator, means for varying the frequency of the oscillator responsive to a change in difference between a reference and a feedback voltage so as to maintain said difference constant, a reference voltage source including means for linearly varying the reference voltage and applying it to said frequency varying means, and a feedback circuit for supplying the feedback voltage to the frequency varying means at a voltage level which is proportional to the logarithm of the output frequency of the variable frequency oscillator including means for converting the oscillator output signal into an intermediate signal of constant voltage amplitude and of a uniform wave shape and of a frequency of fixed relationship to the frequency of said input signal, and means for converting said intermediate signal into said feedback signal including a detector whose output supplies said feedback voltage, a four terminal network coupling the signal converting means to the detector and including a plurality of resistance and capacitance elements selected to cause the output voltage of the detector to vary linearly with the logarithm of the output frequency of the variable frequency oscillator, the output of the detector being electrically connected to said frequency varying means to apply the feedback voltage thereto for comparison with the reference voltage.

4. The oscillator circuit of claim 3 in combination with means for causing the reference voltage varying means to sweep linearly over a desired range of reference voltages so that the frequency of output signal of the oscillator varies anti-logarithmically over a corresponding frequency range.

5. A device for controlling the frequency of the output signal of a variable frequency oscillator so that the logarithm of the latter varies linearly with a reference voltage comprising: means for generating a control voltage varying linearly with the logarithm of the frequency of said oscillator output signal including means for converting said oscillator output signal into an intermediate signal of predetermined voltage amplitude and wave shape and of a frequency of fixed relationship to the frequency of said oscillator output signal, means for converting said intermediate signal into said control voltage including a network made up of a plurality of resistance-capacitance units, said resistance and capacitances of the various units being chosen so that (*a*) each unit causes a change in the intermediate frequency signal transfer function of the network over a selected band of frequencies, (*b*) said bands are spaced so that together they extend over the desired frequency range of the oscillator, and (*c*) as the rate of change of the transfer function of the network as determined by one unit decreases with a change in logarithmic frequency, the rate of change of such transfer function as determined by a succeeding unit increases to compensate for the decreasing rate as determined by said one unit whereby the rate of change of the units together is constant; a variable reference voltage source; and means for comparing said control voltage and said reference voltage and for changing the output frequency of the oscillator so as to maintain the control and reference voltages in predetermined relationship.

6. The device of claim 5 wherein said reference voltage source is a linear potentiometer having a wiper, and means for linearly moving said wiper whereby the oscillator sweeps logarithmically over a range of frequencies responsive to linear movement of the wiper.

7. The device of claim 6 wherein said wiper of the linear potentiometer is connected to a pen mechanism of one axis of an X—Y recorder having means for moving the pen mechanism manually or automatically at a linear rate thereby providing a logarithmic sweep frequency test signal and simultaneous plotting of the logarithmic frequency.

References Cited in the file of this patent

UNITED STATES PATENTS

| | | |
|---|---|---|
| 2,521,058 | Goldberg | Sept. 5, 1950 |
| 2,566,222 | Lynch | Aug. 28, 1951 |
| 2,569,129 | Kamm | Sept. 25, 1951 |
| 2,600,423 | Nolle | June 17, 1952 |
| 2,774,872 | Howson | Dec. 18, 1956 |
| 2,975,370 | Moseley et al. | Mar. 14, 1961 |
| 2,986,704 | Lichtenstein | May 30, 1961 |